United States Patent Office 3,431,088
Patented Mar. 4, 1969

3,431,088
PREPARATION OF AMIDOSULFURYL FLUORIDE BY THE REACTION OF TRICHLOROPHOSPHONITRIDOSULFURYL CHLORIDE WITH HYDROGEN FLUORIDE
Ludwig Konrad Huber, Philadelphia, and Harry Creston Mandell, Jr., Wayne, Pa., assignors to Pennsalt Chemicals Corporation, Philadelphia, Pa., a corporation of Pennsylvania
No Drawing. Filed Dec. 1, 1965, Ser. No. 528,004
U.S. Cl. 23—357          3 Claims
Int. Cl. C01b 21/54, 21/18, 21/10

ABSTRACT OF THE DISCLOSURE

Amidosulfuryl fluoride is prepared by the reaction of trichlorophosphonitridosulfuryl chloride with hydrogen fluoride in the presence of a suitable Lewis acid as a catalyst.

---

This invention relates to a process for making amidosulfuryl fluoride. It involves the reaction of trichlorophosphonitridosulfuryl chloride with hydrogen fluoride in the presence of a Lewis acid.

Amidosulfuryl fluoride, a known compound, may be used for metal treatment, glass polishing, as a catalyst, a chemical intermediate, and a plant growth inhibitor.

The compound amidosulfuryl fluoride has been produced in the past by the reaction of amidosulfuryl chloride and an alkali fluoride. By another route, an alkali fluoride has been allowed to react with isocyanatosulfuryl chloride to form isocyanatosulfuryl fluoride which has been then hydrolyzed to amidosulfuryl fluoride. These processes however require several steps to recover the product. By a third route, amidosulfuryl fluoride has been made by the ammonolysis of disulfuryl fluoride. This route suffers from the disadvantage that, at best, only half of the sulfur is converted to the desired product.

By means of the present invention, amidosulfuryl fluoride is made in a simple reaction from readily available reactants. In accordance with the invention, trichlorophosphonitridosulfuryl chloride, which may have been made in good yields from the simple known reaction of phosphorus pentachloride with sulfamic acid, is allowed to react with hydrogen fluoride in the presence of a Lewis acid. The reaction yields the desired amidosulfuryl fluoride.

The invention is embodied in a reaction which may be characterized by the equation:

$$Cl_3PNSO_2Cl + HF \rightarrow H_2NSO_2F + P(F,Cl)_5 + HCl$$

The presence of a Lewis acid such as boron trifluoride has been found essential to the completion of the above-identified reaction. It should be understood that various other Lewis acids such as antimony fluoride or arsenic fluoride may be substituted in the reaction. It should also be understood that throughout the specification the term hydrogen fluoride may be taken to include not only the gas, but the gas in anhydrous liquid form, that is, hydrofluoric acid.

The product amidosulfuryl fluoride is formed in yields up to about 70% by the process of the invention, and can be isolated and purified simply by distillation, preferably under reduced pressure. The isolation can be facilitated however by the extraction of the crude reaction mixture with an organic solvent such as chloroform, acetonitrile or ethylacetate.

It should be understood that the phosphorus compounds formed as by-products of the above reaction, and having the general formula $P(F, Cl)_5$, have value and can be recovered either for recycling in the formation of the intermediate comprising a reactant in the process of the invention, or for other uses. The process of the invention may, in other words, be considered as a process for forming the phosphorus compounds.

Preferably, the process is accomplished by simply condensing some of the hydrogen fluoride in a trap of polytetrafluoroethylene containing the other reactants. This modus operandi is demonstrated in the following examples.

EXAMPLE I

The trichlorophosphonitridosulfuryl chloride used in the process of the invention is made by reacting sulfamic acid with phosphorus pentachloride. 27 grams (0.108 m.) trichlorophosphonitridosulfuryl chloride is placed in a trap made of polytetrafluoroethylene plastic chilled to below 19.5° C. and contacted by some anhydrous hydrogen fluoride, and some boron trifluoride (2–3 grams). The gas condenses on the liquid and on the wall of the trap. The reaction mixture is gradually brought to room temperature, and the resulting clear solution is kept at this temperature for 2½ days. Part of the hydrogen fluoride evaporates together with some hydrochloric acid and the phosphorus halogenides formed as volatile by-products. The rest of the low-boiling material is stripped off under reduced pressure at room temperature and the liquid residue is distilled in a small glass apparatus. Nearly all of the product distills constantly at 70 to 71° C. and at about 3 to 5 mm. of mercury. (lit. B.P. 88° at 12 mm. of mercury). The yield is 8 g. (about 74% of theory) crude product, which melts at 5° C. For further purification the sample may be redistilled at 54° C. and 0.2 to 0.5 mm. mercury yielding a product which melts at 6° C.

The volatile by-products were analyzed qualitatively and found to contain phosphorus besides chlorine and fluorine. The presence of phosphorus in these lower boiling materials, the way of formation of these materials, and their boiling range (i.e. below 150° C.), are in agreement with the formation of phosphorus pentahalogenides of the general formula $P(F, Cl)_5$.

EXAMPLE II

Eight grams (0.032 m.) trichlorophosphonitridosulfuryl are chilled to below 19.5° C., and placed in a chilled trap made of polytetrafluoroethylene plastic, and are contacted by about 10 milliliters of anhydrous hydrogen fluoride and a small amount of boron trifluoride. After 2½ days at room temperature, low-boiling materials are stripped off at room temperature and at about 5 mm. mercury. The liquid residue is then treated with benzene to remove the unreacted starting material. The amidosulfuryl fluoride product is extracted with chloroform, and the chloroform extract is concentrated and finally distilled in a small glass apparatus at 0.3 to 0.4 mm. of mercury. The yield is about 0.3 gram (10% of theory) colorless solid which melts at 6–8° C.

The precise mechanism for the reaction is not known. However, the action of boron trifluoride or other acid catalyst suggests a proton-catalyzed mechanism by which the phosphorus-nitrogen double bond is cleaved and the phosphorus halogenide is split off.

While the reaction may be accomplished at atmospheric pressure, application of super-atmospheric pressures are feasible. However, venting of the reaction mixture will be advantageous or necessary to remove at least some of the reaction by-products and to thereby shift the equilibrium of the reaction. Upper limits of super-atmosheric pressures are those generated by the reactants at temperatures up to about 100° C.

The reaction may be accomplished at temperatures in the range between −40° C. and +100° C. The most preferred temperatures are within the range between −10°

C. and +20° C. In the use of anhydrous hydrofluoric acid not in solvent, the upper temperature limit is roughly the boiling point of hydrogen fluoride (19.5° C. or possibly somewhat higher).

The effect of the Lewis acid as above indicated appears to be a catalytic one, i.e., less than equimolar amounts of boron trifluoride are sufficient. In Example I about 2 to 3 grams suffice, but smaller amounts are sufficient to provide an acidic reaction medium.

It will be understood that numerous changes and variations may be made from the above description and examples without departing from the spirit and scope of the invention.

We claim:

1. A process for the preparation of amidosulfuryl fluoride comprising reacting trichlorophosphonitridosulfuryl chloride with hydrogen fluoride at a temperature from about −40° C. to about 100° C. in the presence of a catalytic amount of a Lewis acid selected from the group consisting of boron trifluoride, antimony fluoride and arsenic fluoride.

2. The process as described in claim 1 wherein the Lewis acid is boron trifluoride.

3. A process as described in claim 1 wherein the reaction is conducted at a temperature from about −10° C. to +20° C.

References Cited

Colburn Editor: "Developments In Inorganic Chemistry," vol. 1, 1966: Chapter III, Developments in the Inorganic Chemistry of Compounds Containing the Sulphur-Nitrogen Bond, by Margot Becke-Goehring et al., pp. 151–240, pertinent p. 168, with reference 3-J., Chem. Ber., 95 (1962) 625.

OSCAR R. VERTIZ, *Primary Examiner.*

HOKE S. MILLER, *Assistant Examiner.*